US009846106B2

(12) United States Patent
Chien et al.

(10) Patent No.: US 9,846,106 B2
(45) Date of Patent: Dec. 19, 2017

(54) APPARATUS AND DEVICE FOR USE IN AUTOMOTIVE TESTING

(71) Applicants: Toyota Motor Engineering & Manufacturing North America, Inc., Erlanger, KY (US); Toyota Jidosha Kabushiki Kaisha, Toyota-shi Aichi-ken (JP); The Ohio State University, Columbus, OH (US); Indiana University Research and Technology Corporation, Indianapolis, IN (US)

(72) Inventors: Stanley Yung-Ping Chien, Indianapolis, IN (US); Chi-chih Chen, Dublin, OH (US); Rini Sherony, Ann Arbor, MI (US); Hiroyuki Takahashi, Toyota (JP); Jason Brink, Brazil, IN (US); Qiang Yi, Indianapolis, IN (US); Domenic Belgiovane, Columbus, OH (US)

(73) Assignees: Toyota Motor Engineering & Manufacturing North America, Inc., Erlanger, KY (US); Toyota Jidosha Kabushiki Kaisha, Toyota-shi (JP); The Ohio State University, Columbus, OH (US); Indiana University Research and Technology Corporation, Indianapolis, IN (US)

( * ) Notice: Subject to any disclaimer, the term of this patent is extended or adjusted under 35 U.S.C. 154(b) by 240 days.

(21) Appl. No.: 14/729,663

(22) Filed: Jun. 3, 2015

(65) Prior Publication Data

US 2016/0356674 A1    Dec. 8, 2016

(51) Int. Cl.
*G01M 17/007* (2006.01)
*H01Q 15/14* (2006.01)
(Continued)

(52) U.S. Cl.
CPC .......... *G01M 17/007* (2013.01); *H01Q 15/14* (2013.01); *B62H 3/06* (2013.01); *G01S 13/931* (2013.01); *G01S 2007/4086* (2013.01)

(58) Field of Classification Search
CPC .. G01M 17/007; G01M 17/0078; G01M 7/08; G01N 3/30; B62H 3/04; B62H 3/06;
(Continued)

(56) References Cited

U.S. PATENT DOCUMENTS 3,847,426 A * 11/1974 McGettigan ............ B60R 19/34
188/376
3,927,554 A * 12/1975 Langhorst ......... G01M 17/0078
116/203

(Continued)

OTHER PUBLICATIONS

M. I. Skolnik, "Introduction to Radar Systems," second edition; ISBN 0-07-057909-1; McGraw-Hill Book Company; New York, NY, USA; copyright in the year 1980; p. 33.*

(Continued)

*Primary Examiner* — Bernarr E Gregory
(74) *Attorney, Agent, or Firm* — Dinsmore & Shohl LLP

(57) ABSTRACT

An apparatus and device for repetitive use in automotive testing is provided. The apparatus includes a frame dimensioned in the same shape as a bicycle frame. The frame includes a first support beam and a plurality of second support beams. The apparatus further includes an elastic member elastically coupling each of the plurality of second support beams to the first support beam so as to allow the frame to separate when impacted and be easily reassembled for further testing. The device includes a disk having a first radar transparent layer opposite a second radar transparent layer and a reflective film disposed between the first radar transparent layer and the second radar transparent layer. The reflective film has a radar cross section pattern similar to that of an actual bicycle wheel when seen by automotive radar.

27 Claims, 9 Drawing Sheets

(51) Int. Cl.
*G01S 13/00* (2006.01)
*B62H 3/06* (2006.01)
*G01S 13/93* (2006.01)
*G01S 7/40* (2006.01)

(58) Field of Classification Search
CPC ........ H01Q 15/14; H01Q 23/00; B60R 19/02; B60R 19/24; B60R 19/26; B60R 19/34
See application file for complete search history.

(56) References Cited

U.S. PATENT DOCUMENTS

| | | | |
|---|---|---|---|
| 3,938,151 A * | 2/1976 | Trenam | H01Q 15/14 342/10 |
| 4,079,268 A * | 3/1978 | Fletcher | H01Q 23/00 307/151 |
| 6,411,896 B1 | 6/2002 | Shuman et al. | |
| 8,457,877 B2 | 6/2013 | Kelly et al. | |
| 8,621,918 B2 | 1/2014 | Sacher et al. | |
| 2005/0001404 A1 | 1/2005 | Mihelic | |
| 2011/0238309 A1 | 9/2011 | Tsunekawa | |
| 2015/0066348 A1 | 3/2015 | Baba | |

OTHER PUBLICATIONS

U.S. Appl. No. 14/141,821, filed Dec. 27, 2013.

\* cited by examiner

APPARATUS AND DEVICE FOR USE IN AUTOMOTIVE TESTING

FIELD OF THE INVENTION

An apparatus for repetitive use automotive testing is provided. More specifically, an apparatus having a frame configured to resemble and have a radar cross section of a bicycle, wherein the frame includes a detachable member detachably coupling the frame together so as to allow the frame to separate when impacted and to be easily reassembled for further testing is provided.

BACKGROUND OF THE INVENTION

Automotive companies develop an automatic braking systems to avoid or mitigate vehicle collisions. In particular, the automatic emergency braking system may be designed to avoid or mitigate a collision with a bicyclist. These systems require the detection of a bicycle. Such systems use camera and/or radar currently operating at a frequency between 76-77 GHz to detect the bicycle. Bicycles have a predetermined radar signature which is recognized by the radar. Bicycles have a predetermined shape and outline which is recognized by an optical sensor such as a camera. The bicycle and the vehicle are used to perform different scenarios, and the performance of the automatic braking system is then evaluated.

Currently, evaluation of an emergency braking system requires an actual bicycle. However, using an actual bicycle may be costly as the bicycle may damage the test vehicle or testing may require multiple bicycles as the bicycle may be rendered inoperable after a collision with the test vehicle. The use of a fully functional bike is necessary in the evaluation of the emergency braking system as it is necessary to correctly evaluate the effectiveness of optical sensors and radars.

Accordingly, it remains desirable to have an apparatus configured to have a radar cross section pattern similar to that of a bicycle, and to also resemble, in shape and size, a bicycle, wherein the apparatus is further configured to withstand a load from a crash test vehicle and minimize damage to the test vehicle. In particular, it is required to have an apparatus which looks like a real bicycle for the automotive emergency braking system when viewed from different angles and has the same radar cross section from different angles as an average bicycle to automotive radars.

SUMMARY OF THE INVENTION

An apparatus for repetitive use in automotive testing is provided. The apparatus includes a frame. The frame has a first support beam and a plurality of second support beams assembled together so as to form the general shape of a bicycle frame. The apparatus further includes a detachable coupling member configured to attach the second support beams to the first support beams, and detach the second support beams from the first support beams upon experiencing a predetermined load. In one example, the detachable coupling member is an elastic member. The elastic member elastically couples each of the second support beams to the first support beam so as to allow the frame to separate when impacted by the test vehicle and to be easily reassembled for further automotive testing.

The first support beam and the second support beam include an outer surface formed of a conductive material configured to similar radar cross section of a bicycle frame so as to ensure the radar system is properly identifying the apparatus. Further, the first and second support beams are assembled together to resemble the look of a bicycle so as to been recognized by an optical sensor such as a camera. The elastic member may be an elastic band such as an elastic band commonly referred to as a bungee cord.

The apparatus further includes a wheel. The wheel is a disk having a first radar transparent layer. The disk further includes a radar reflective film, the first radar transparent layer is mounted onto the radar reflective film. In another embodiment, the wheel includes a second radar transparent layer. In such an embodiment, the radar reflective film is disposed between the first and second opposite radar transparent layers. The radar reflective film has a radar cross section similar to that of an actual bicycle wheel. Accordingly, the apparatus may be subjected to a plurality of collisions from a test vehicle and easily reassembled after each impact.

A device configured to reflect a radar signal similar to that of an actual bicycle wheel is also provided. The device includes a disk having a first radar transparent layer. The disk further includes a reflective film. The first radar transparent layer is mounted on the reflective film. In another embodiment, the disk includes a second radar transparent layer and the reflective film is disposed between the first radar transparent layer and the second radar transparent layer. The reflective film has a radar cross section of the actual bicycle wheel.

The first and second radar transparent layers are formed of a durable and rigid material configured to allow light and radar signals operating a predetermined frequency range to pass through. Such materials include polycarbonate. The reflective film may be formed by a printed circuit film, laminating, etching or printing a layer of conductive material on a substrate. The reflective film may be dimensioned to have a plurality of reflective strips extending radially from a center patch. The reflective film further includes an outer strip disposed on a circumferential edge of the reflective film. The reflective strips and the outer strip are formed of a conductive material configured to reflect a radar signal operating at a predetermined frequency range. In particular, the conductive material may reflect an automotive radar signal.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE INVENTION

An apparatus for use in repetitive automotive testing is provided. The apparatus includes a frame having a first support beam and a plurality of second support beams coupled together to assume the shape of a frame. The apparatus frame includes a detachable coupling member configured to both attach the second support beams to the first support beam, and also detach the second support beams from the first support beams upon experiencing a predetermined load. In an illustrative example, the detachable coupling is an elastic member coupling each of the plurality of second support beams to the first support beam so as to allow the frame to separate when impacted and to be easily reassembled for further testing. The first support beam and the second support beam may include a first reflective layer forming the outer surface. The first reflective layer is configured to have a radar cross section similar to that of an actual bicycle frame as seen by an automotive radar. Accordingly, the apparatus may be used multiple times in automotive testing so as to facilitate the development of automotive automatic emergency braking systems and reduce the cost of the development of automotive automatic emergency braking systems relative to the use of an actual bicycle.

As discussed above, automotive automatic braking systems include a radar configured to detect signals for not only the frame but also the wheels. The wheels and the frame of an actual bicycle have different radar cross section patterns. Accordingly, a device configured to have a radar cross section of an actual bicycle wheel is also provided. The device includes a disk. The disk includes a first radar transparent layer and a reflective film. The first radar transparent layer is mounted on the reflective film. The reflective film has a radar cross section pattern of an actual bicycle wheel. The reflective film includes a plurality of reflective strips. The reflective strips extend radially from a center patch of the reflective film. The reflective film further includes an outer strip disposed on the circumferential edge of the reflective film. The outer strip is configured to provide a radar cross section pattern similar to that of an actual rim of a bicycle wheel as seen by radar. The reflective strips are configured to have a radar cross section pattern similar to that of the spokes of a wheel as seen by radar. The outer strip, reflective strips and the center patch are further configured to resemble the spokes, rim and hub of the wheel when seen by an optical sensor.

Figure 1:
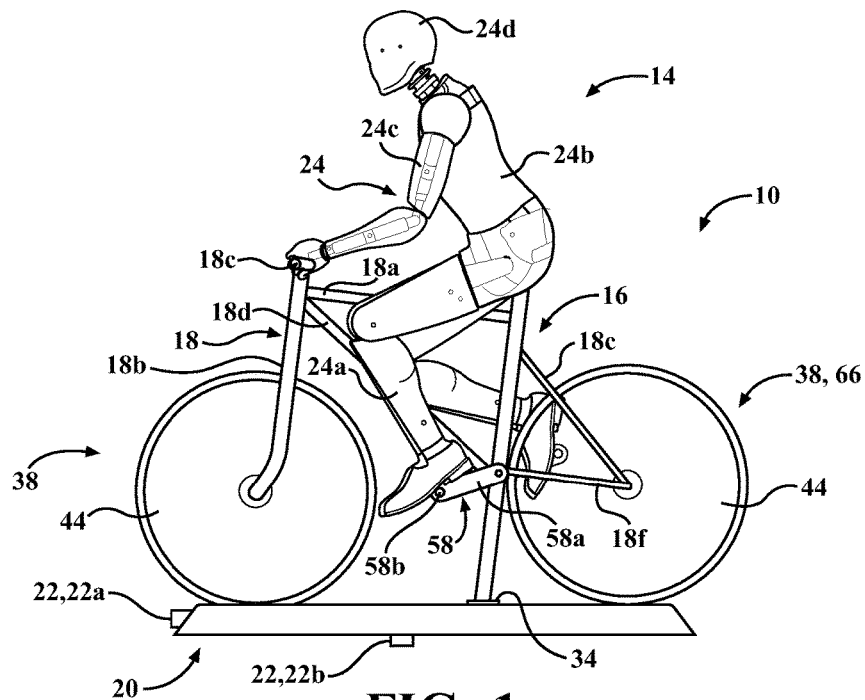
FIG. 1 is a perspective view of the apparatus with a mannequin mounted thereon.
Figure 2:
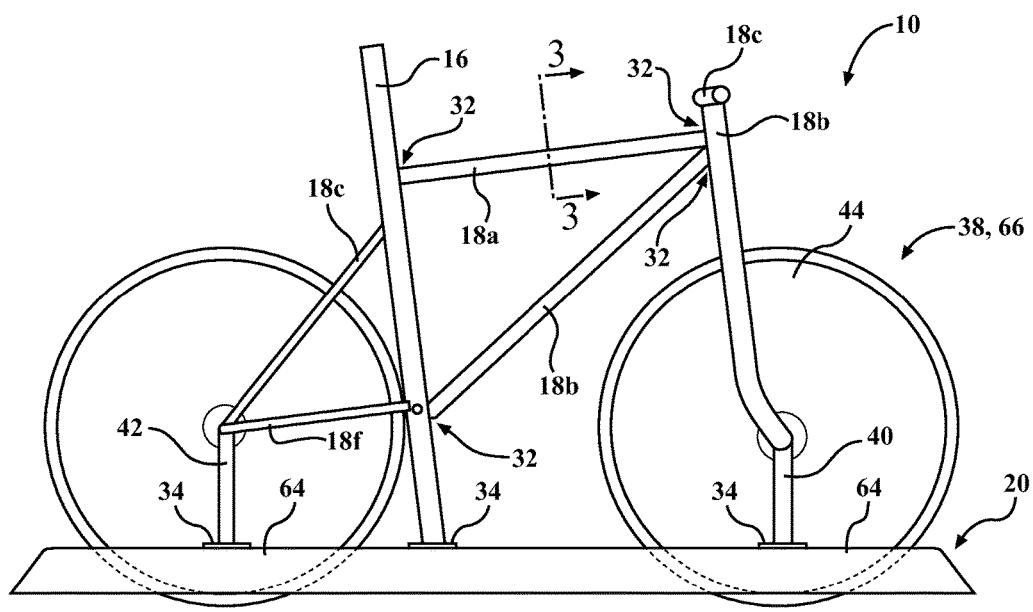
FIG. 2 is a perspective view of the apparatus configured to have the wheels rotated.

With reference now to FIGS. 1 and 2, an illustrative example of the apparatus 10 is provided. The apparatus 10 includes a frame 12. FIG. 1 shows a mannequin 14 mounted to the frame 12. The frame 12 includes a first support beam 16 and a plurality of second support beams 18. The first support beam 16 is mounted to a carriage 20. The carriage 20 includes attachment features 22 for allowing the carriage 20 to be moved to replicate an automotive testing condition.

As shown in FIG. 1, one attachment feature 22 may be a cable attachment 22a to allow a motor (not shown) to pull the carriage 20 along a test track (not shown). Alternatively, the attachment feature 22 may be disposed on the underside of the carriage 20. The attachment feature 22 is rail attachment 22b for engaging a rail (not shown) of a sled system (not shown).

The mannequin 14 is mounted onto the frame 12 and includes articulated limbs 24. In particular the articulated limbs 24, include legs 24a are configured to articulate so as to replicate the motion of legs pedaling a bicycle, the torso 24b, arms 24c and head 24d are shaped and dimensioned to for the type of testing to be conducted. Accordingly, the mannequin 14 may be dimensioned for an average sized male or female of a certain age. The mannequin 14 may have an outer surface having a radar cross section pattern similar to that of the radar cross section pattern of a human when detected by automotive radar. Such technology is current known and used and is disclosed in U.S. application Ser. No. 14/141,821, filed Dec. 27, 2013, now U.S. Pat. No. 9,263,800, the contents of which is incorporated herein by reference.

FIG. 2 shows the frame 12 assembled together to resemble a bicycle so as to be recognized as a bicycle by an optical sensor. For illustrative purposes, the frame 12 is shown being formed to assume the shape of a mountain bike. However, it should be appreciated that the frame may assume the shapes of other bikes. The first support beam 16 is a generally elongated tubular member replicating the seat support tube of an actual bike. The first support beam 16 extends upwardly from the carriage 20 at an angle.

The frame 12 includes a plurality of second support beams 18 which replicate the other parts of an actual bicycle frame. Accordingly, the frame 12 may be easily recognized as a bicycle by an optical sensor such as a camera. One of the second support beams 18 is a top cross beam 18a extends between the first support beam 16 and a front beam 18b. The front beam 18b is configured to support a handlebar 18c and includes a lower portion replicating the wheel support of an actual bike. Another of the second support beams 18, is a bottom cross beam 18d and extends at an angle from the front beam 18b to the first support beam 16. A pair of rear wheel support beams 18e, 18f are shown mounted to the first support beam 16 and coupled together where the axle of the rear wheel of an actual bicycle would be.

Figure 3:
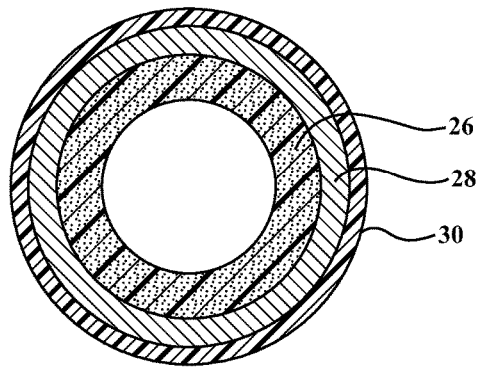
FIG. 3 is a cross section of the second support beam taken along lines 3-3 of FIG. 2.

With reference now to FIG. 3, a cross section of the second support beam 18 taken along lines 3-3 in FIG. 2 is provided. It should be appreciated that the cross section shown in FIG. 3 is representative of not only any of the second support beams 18 but also of the first support beam 16. The first and second support beams 16, 18 are configured to be shatter-resistant. The first support beam 16 and the second support beams 18 include a tube 26 defining a bore 26a. The tube 26 is formed of a durable and rigid material such as polycarbonate or garolite.

The first support beam 16 and the second support beams 18 may further include an intermediate layer 28 formed of a resilient material such as foam. The intermediate layer 28 is mounted over the tube 26. The intermediate layer 28 is configured to add dimension to the tube 26 so as to provide the first and second support beams 16, 18 with a diameter similar to that of the frame of an actual bicycle. Accordingly, an intermediate layer 28 may be omitted in instances where the diameter of the tube 26 is the same as the diameter of a bicycle frame.

The first support beam 16 and the second support beams 18 further includes a first layer 30 mounted over the intermediate layer 28 or the tube 26 in instances where an intermediate layer 28 is not used. The first layer 30 may be configured to have a radar cross section pattern similar to that of an actual bicycle frame so as to be identified by automotive radar. Any such material currently known and used in the art may be adapted for use herein illustratively including a steel, copper fabric, titanium, or aluminum. It should be appreciated by those skilled in the art that automotive radar in the United States currently operates between 76-77 GHz, whereas other countries such as Japan use 60 GHz, and European countries use 79-81 GHz. Accordingly, the operating frequency of automotive radar may change, and thus the materials used to form the first layer 30 may also change, as discussed further below.

Figure 4:
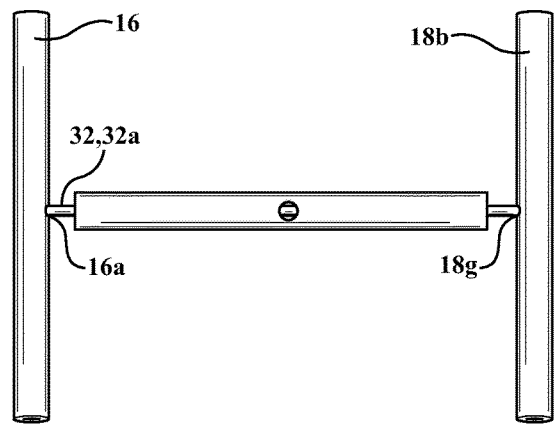
FIG. 4 is an illustrative view showing the elastic member coupling the second support beam to the first support beam.
Figure 13:
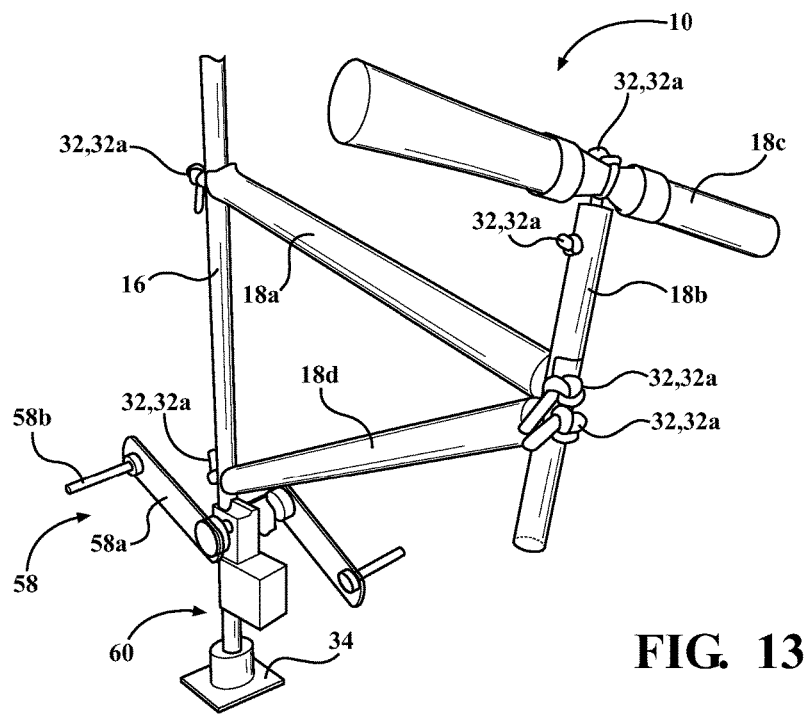
FIG. 13 is a view showing the drive mounted to the bottom portion of the first support beam.

With reference now to FIGS. 4 and 13, an exemplary illustration showing the detachable coupling member 32 is shown. The detachable coupling member 32 is configured to hold the ends of the second support beams 18 to each other and also to the first support beam 16. The detachable coupling member is further configured to allow the frame 12 to detach so as to dissipate the load of a test vehicle impact into kinetic energy, but allow the frame 12 to be easily reassembled.

In a preferred embodiment, the detachable coupling member 32 is an elastic member 32a coupling the frame 12 together is provided. FIG. 4 is an isolated view showing the top cross beam 18a coupled to the first support beam 16 on one end and the front beam 18b on the other. The first support beam 16 includes an aperture 16a for which one end of the elastic member 32a is fixedly mounted to and the front beam 18b includes an aperture 18g for which the other end of the elastic member 32a is mounted to. As seen, each of the second support beams 18a-18f are coupled to the first support beam 16 by a tensioned engagement of the elastic member 32a. However, it should be appreciated that the detachable coupling member 32 may be magnets, snap fitment engaging members or the like.

The elastic member 32a is fed through the bore 26a of the top cross beam 18a and is configured to urge the front beam 18 and the first support beam 16 towards each other pinching the top cross beam 18a therebetween. FIGS. 4 and 13 show how the elasticity of the elastic member 32a allows for the front beam 18 to be displaced from the first support beam 16. Upon impact by a test vehicle, the first support beam 16 and the second support beams 18a-18f are driven away from each other by the impact and the load is distributed through the expansion of the elastic member 32a. Further, the elastic member 32a retains the frame 12 together so as to make reassembly easy.

Figure 5:
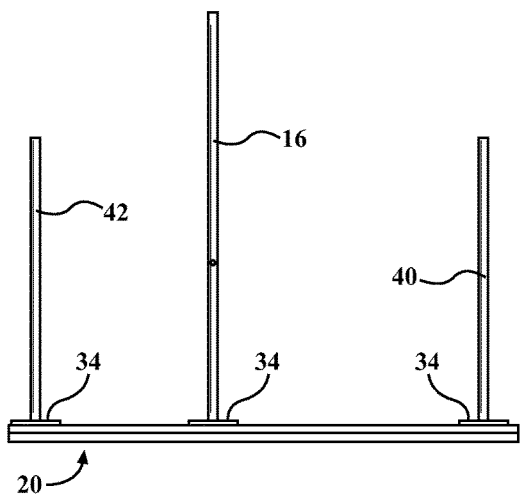
FIG. 5 is an isolated view of the carriage shown in FIG. 2.

With reference now to FIG. 5, the frame 12 is shown mounted to the carriage 20. The carriage 20 may be configured to carry the frame 12 in a desired motion. The frame 12 is detachably mounted to the carriage 20 so as to help prevent damage to the test vehicle. For instance, the bottom end of the frame 12 include a magnet 34 and the carriage 20 includes a magnet receiving portion 36 configured to engage the magnet 34 of the frame 12 so as to allow the frame 12 to be disengaged from the carriage 20 thus preventing any deformation at the base of the frame 12, and damage to the test vehicle. The magnet receiving portion 36 may be steel plates disposed where the frame 12 is to be mounted to. FIG. 5 also shows the apparatus 10 further configured to support a rotatable wheel 38. In such an embodiment the apparatus 10 further includes a front tire support 40 and a back tire support 42.

The front and back tire supports 40, 42 are formed of a radar transparent material so as to prevent the front and back tire supports 40, 42 from interfering with any signals emitted by the automotive radar signal reflected off the wheel 38. The front and back tire supports 40, 42 may also be detachably mounted to the carriage. For instance, the bottom ends of the front and back tire supports 40, 42 may also include a magnet 34. Accordingly, the entire apparatus 10 may be knocked over by a test vehicle, and thus reducing damage to the test vehicle.

Figure 6:
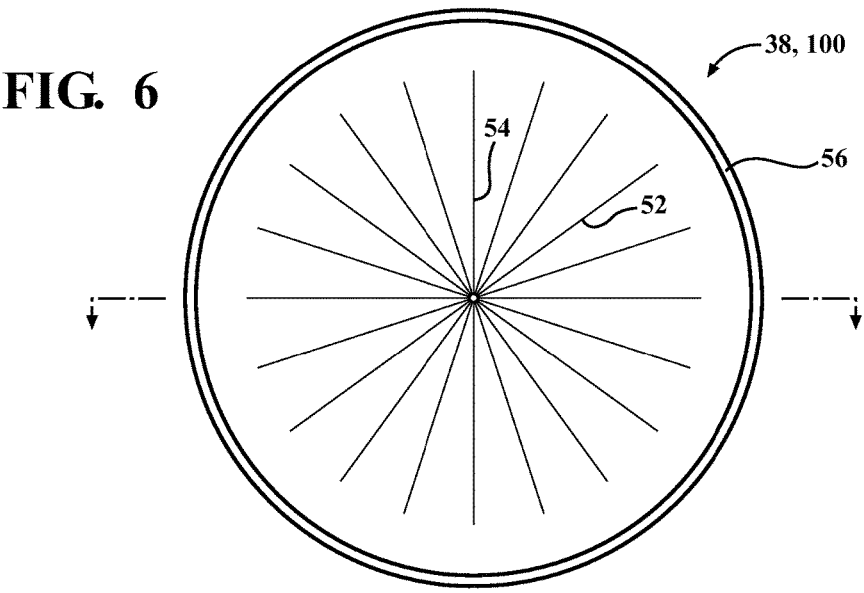
FIG. 6 is a top down view of the device having a radar cross section pattern of a bicycle wheel.
Figure 7A:
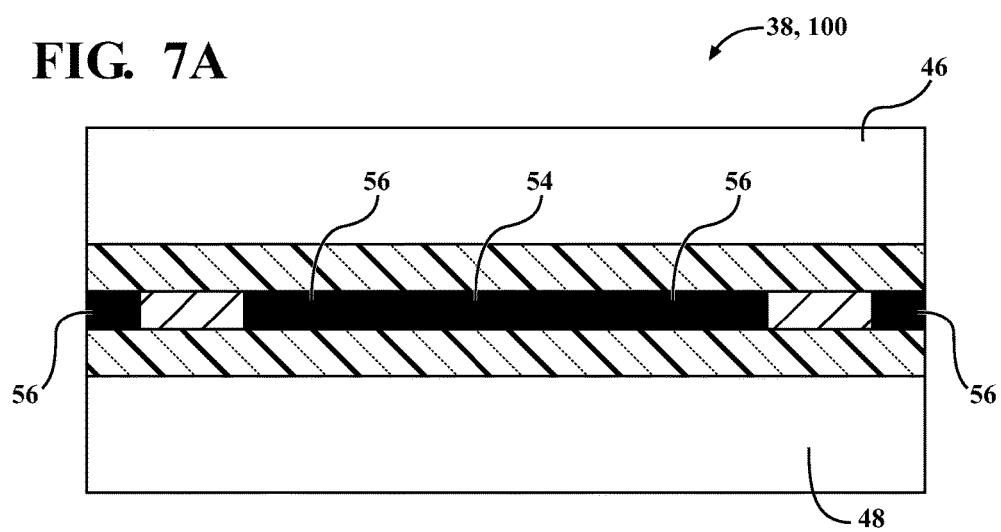
FIG. 7A is a cross-sectional view of the device shown in FIG. 6 taken along lines 7-7.
Figure 7B:
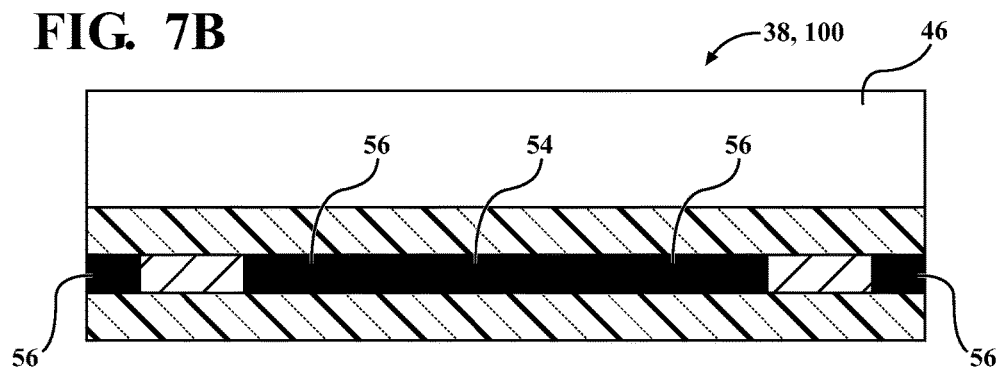
FIG. 7B is a cross-sectional view of an embodiment of the device having a second radar transparent layer.

With reference now to FIGS. 6, 7A and 7B, the apparatus 10 further includes a pair of wheels 38. The wheels 38 is mounted to the frame 12. Each wheel 38 is similar to the other, and thus a discussion of one wheel 38 is sufficient to describe the other. The wheel 38 includes disk 44. The disk 44 is circular and has the same radius of an actual bicycle wheel. The disk 44 includes a first radar transparent layer 46 and a reflective film 50 (as shown specifically in FIG. 7B). The first radar transparent layer 46 is mounted onto the reflective film 50.

With reference now to FIG. 7B, the disk 44 may further include a second radar transparent layer 48. The second radar transparent layer 48 is opposite the first radar transparent layer 46, and the reflective film 50 is disposed between the first radar transparent layer 46 and the second radar transparent layer 48. The reflective film 50 is configured to have a radar cross section of an actual bicycle wheel 38.

The reflective film 50 is further dimensioned to resemble the spokes, hub and rim of an actual wheel so as to be recognized by an optical sensor such as a camera. It should be appreciated that the first radar transparent layer 48 is also configured to allow light to pass so as to allow the physical dimensions of the reflective film to be seen by the optical sensor.

The first and second radar transparent layers 46, 48 are formed of a generally rigid and durable material which is both radar and light transparent, meaning that radar signals operating a predetermined frequency range and light may pass through the material. Such materials illustratively include polycarbonate sheets. The first and second radar transparent layers 46, 48 protect the reflective film 50, allow the reflective film 50 to return a signal from the automotive radar, and allow the physical shape of the reflective film 50 to be seen by an optical sensor.

FIG. 6 shows the reflective film 50 disposed underneath the first radar transparent layer 46. The reflective film 50 includes a plurality of reflective strips 52 extending outwardly and radially from a center patch 54. The reflective film 50 further includes an outer strip 56 disposed on the circumferential edge of the reflective film 50. The center patch 54, the reflective strips 52 and the outer strip 56 may be formed of the same material.

The reflective film 50 may be a printed circuit board manufactured known printed circuit board manufacturing machines, or may be formed by laminating, etching or printing a layer of conductive material on a substrate. The reflective film 50 includes a plastic film substrate with the reflective strips 52 printed onto the plastic film substrate.

The distal ends of each of the reflective strips 52 are equally spaced apart from the outer strip 56. The reflective strips 52 and the center patch 54 are configured to have a radar cross section pattern to the spoke from an actual bicycle wheel 38 whereas the outer strip 56 is configured to have a radar cross section similar to that of the rim of an actual bicycle wheel 38. An actual bike tire may be mounted to the wheel 38 so as to give the apparatus 10 an optical signature similar to that of an actual bicycle wheel. This is helpful in instances where the test includes testing an automatic braking system having an optical camera for detecting objects. Further, as the first and second radar transparent layers 46, 48 are also configured to allow light to pass, an optical sensor will recognize the reflective strip 50 as being the spokes and rim of a bicycle wheel.

As discussed above, the reflective strips 52, outer center patch 54 and outer strip 56 are formed of a material configured to reflect radar. Any such material currently known and used to reflect radar may be adapted for use herein, illustratively including gold. It should also be appreciated that any combination of material configured to reflect radar may be used based upon the radar cross section pattern desired. For instance, the reflective strips 52, outer center patch 54 and outer strip 56 may include three layers wherein an outer layer is formed of gold, an intermediate layer is formed of tin, and a bottom layer is formed of copper. It should also be appreciated that the number of strips and the dimension of the strips may be modified based upon the desired radar cross section pattern. As discussed above, the reflective film 50 is configured to be recognized by automotive radar as being a bicycle wheel, and thus depending upon the country, the operating frequency of the automotive radar being evaluated may change and thus the physical dimensions and shape of the reflective strips 52, center patch 54 and outer strip 56 may be modified accordingly without deviating from the scope of the appended claims.

For instance, the reflective strips 52 may have a generally rectangular dimension or the reflective strips 52 may have a generally trapezoidal dimension. In the instance of a reflective strip 52 having a trapezoidal dimension, the proximal end of the strip is wider than the distal end of the reflective strip 52. The number of reflective strips 52 may also vary based upon the desired radar cross section pattern.

Figure 8:
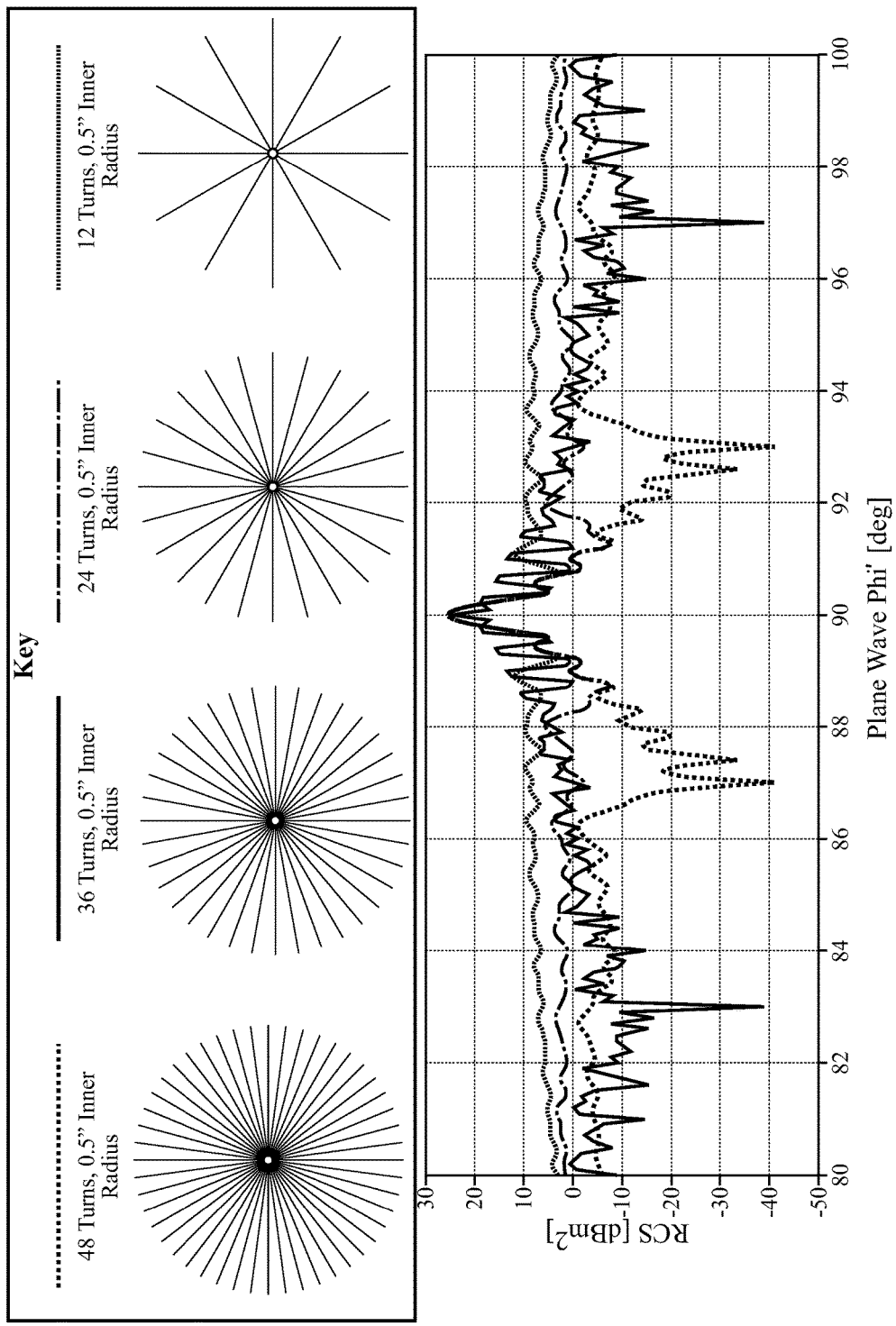
FIG. 8 is a chart showing how the number of reflective strips affect the radar reflective performance of the wheel.
Figure 10:
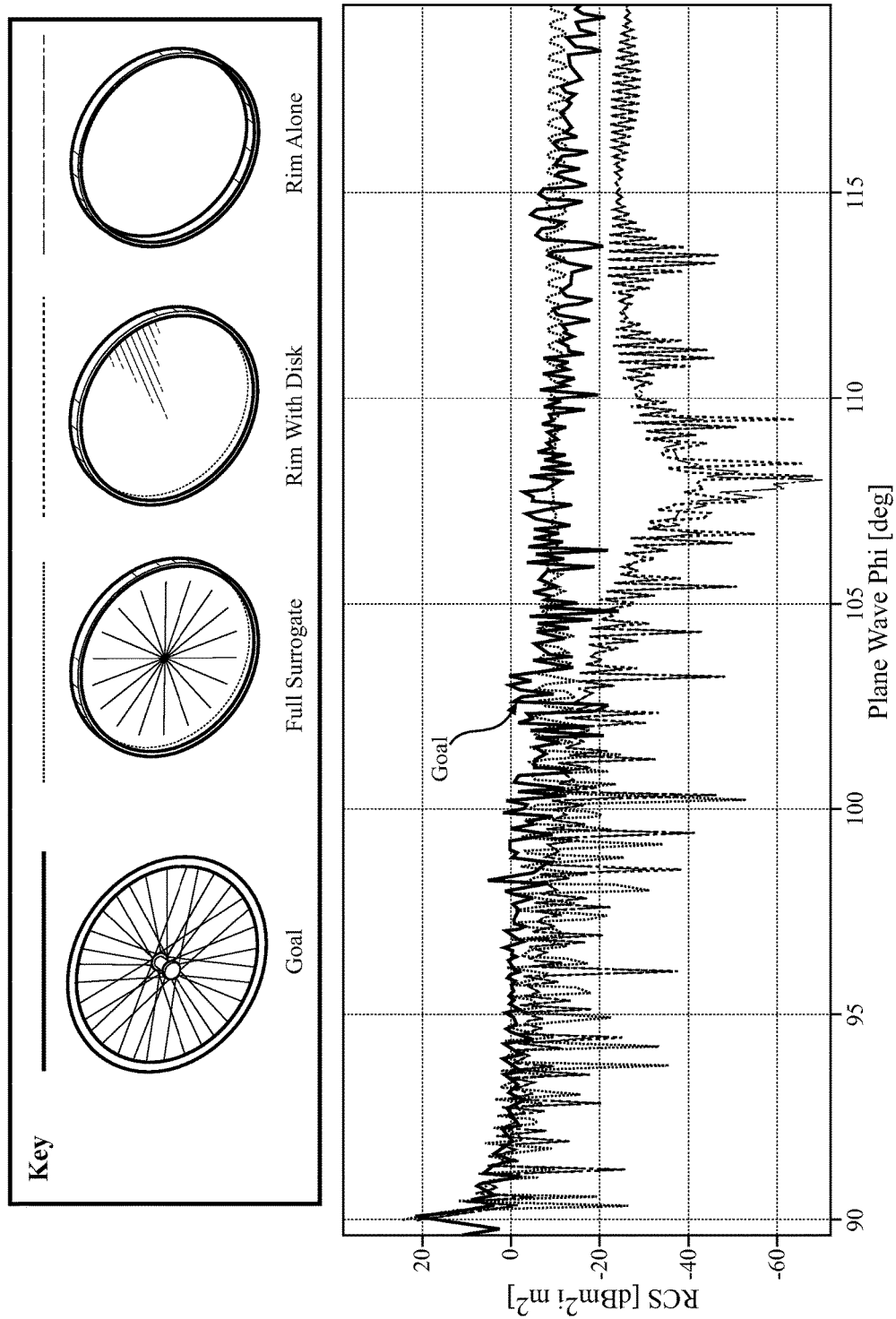
FIG. 10 is a chart comparing the radar cross section of outer strip, the reflective strips and the outer strip, and an actual bicycle wheel.

With reference now to FIG. 8, a chart is provided showing the different radar cross sections of wheels 38 having a length of 0.5 feet. FIG. 8 shows how the radar cross section pattern is affected by the number of reflective strips 52 printed on the reflective film 50. FIG. 8 also shows the radar cross section pattern of an actual bicycle wheel 38. The actual bicycle wheel modeled is shown in FIG. 10. Testing shows that a reflective film 50 having twenty-six (26) reflective strips 52 extending radially from the center patch 54 provides the closest radar cross section to that of an actual bicycle wheel 38. The actual bicycle wheel 38 used for testing has a diameter of 26 inches with 34 spokes each of which have a diameter of 0.08 inch. The chart was conducted by pointing a radar operating between 76-77 GHz at various angles to the planar surface of the wheel 38 wherein ninety (90) degrees represents a target line perpendicular to the planar surface of the wheel 38.

Figure 9:
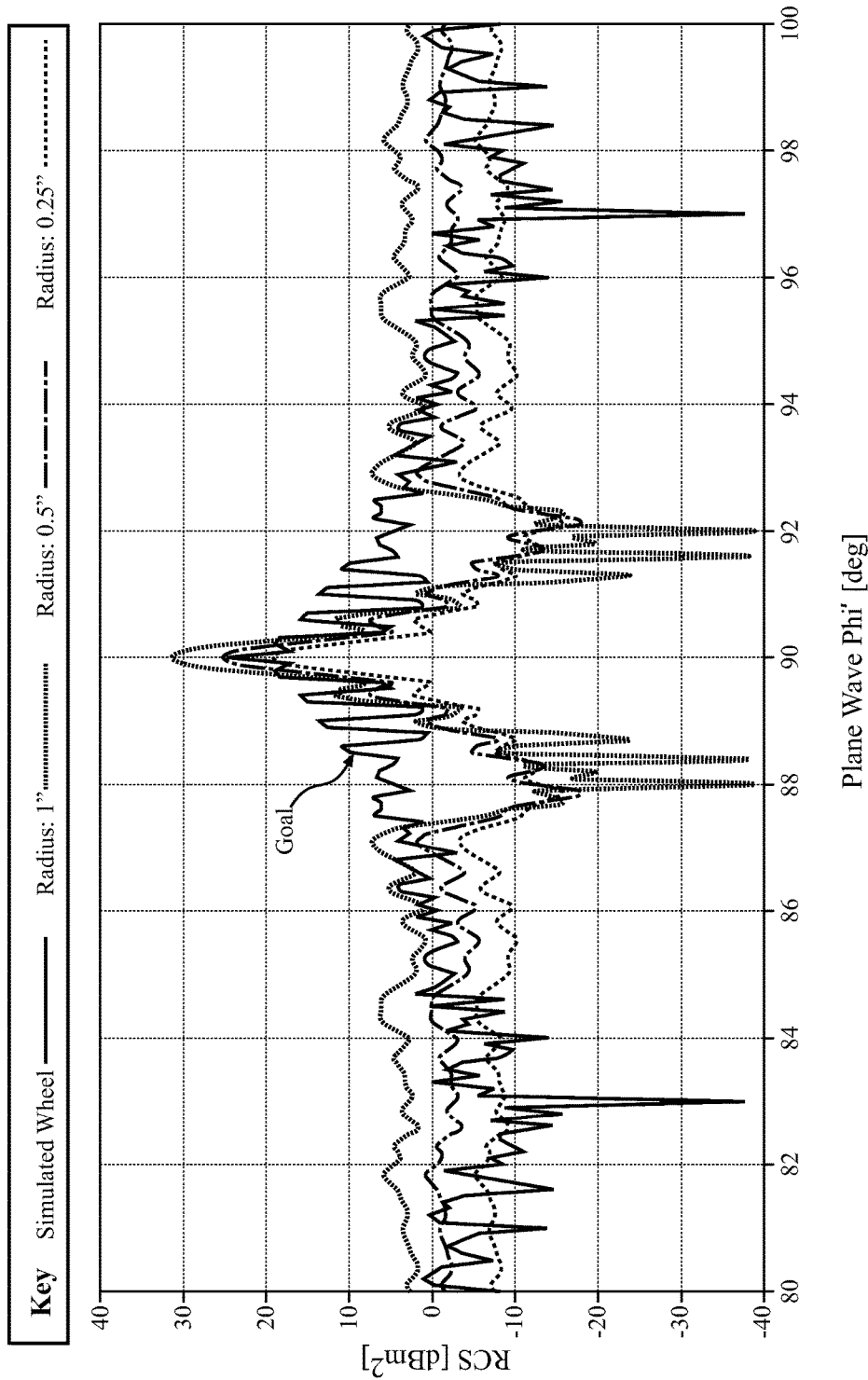
FIG. 9 is a chart showing how the length of the center patch affects the radar cross section pattern.

With reference now to FIG. 9, a diagram showing the effect of the changing radius of the center patch 54 is provided. As discussed above, the center patch 54 is configured to replicate the wheel 38 axle and sprocket of an actual bicycle. FIG. 9 shows that the size of the center patch 54 provides another degree of freedom for adjusting the radar cross section level. As shown, the radar cross section pattern generally increases as the patch size increases. The diagram was taken using a reflective film 50 with 38 radial reflective strips 52.

With reference now to FIG. 10, a comparison of the individual parts of the wheel 38 with respect to an actual bicycle wheel is shown. As shown, the outer strip 56 is the main contributor to the radar cross section pattern for the 90 degree to 120 degree region. The chart shows the radar cross section pattern for four scenarios, (1) the outer strip 56; (2) the outer strip 56 labeled as "rim" printed on the thin film, (3) the wheel 38 with the reflective strips 52, outer center patch 54 and outer strip 56; and (4) an actual bicycle wheel. As seen, the outer strip printed on the thin film and the outer strip alone are similar and below the full response after the addition of the reflective strips 52. Accordingly, the study shows that the center patch 54 has little effect on the overall pattern of the wheel 38 and thus may be eliminated. Accordingly, the wheel 38 may include a hole where the center patch 54 is located for facilitating the rotation of the wheel 38 on the frame 10 as discussed in FIGS. 14A and 14B. FIG. 10 also shows that the main pattern of the response is caused by the outer strip and thus the width of the outer strip 56 will dominate the radar cross section pattern.

Figure 11:
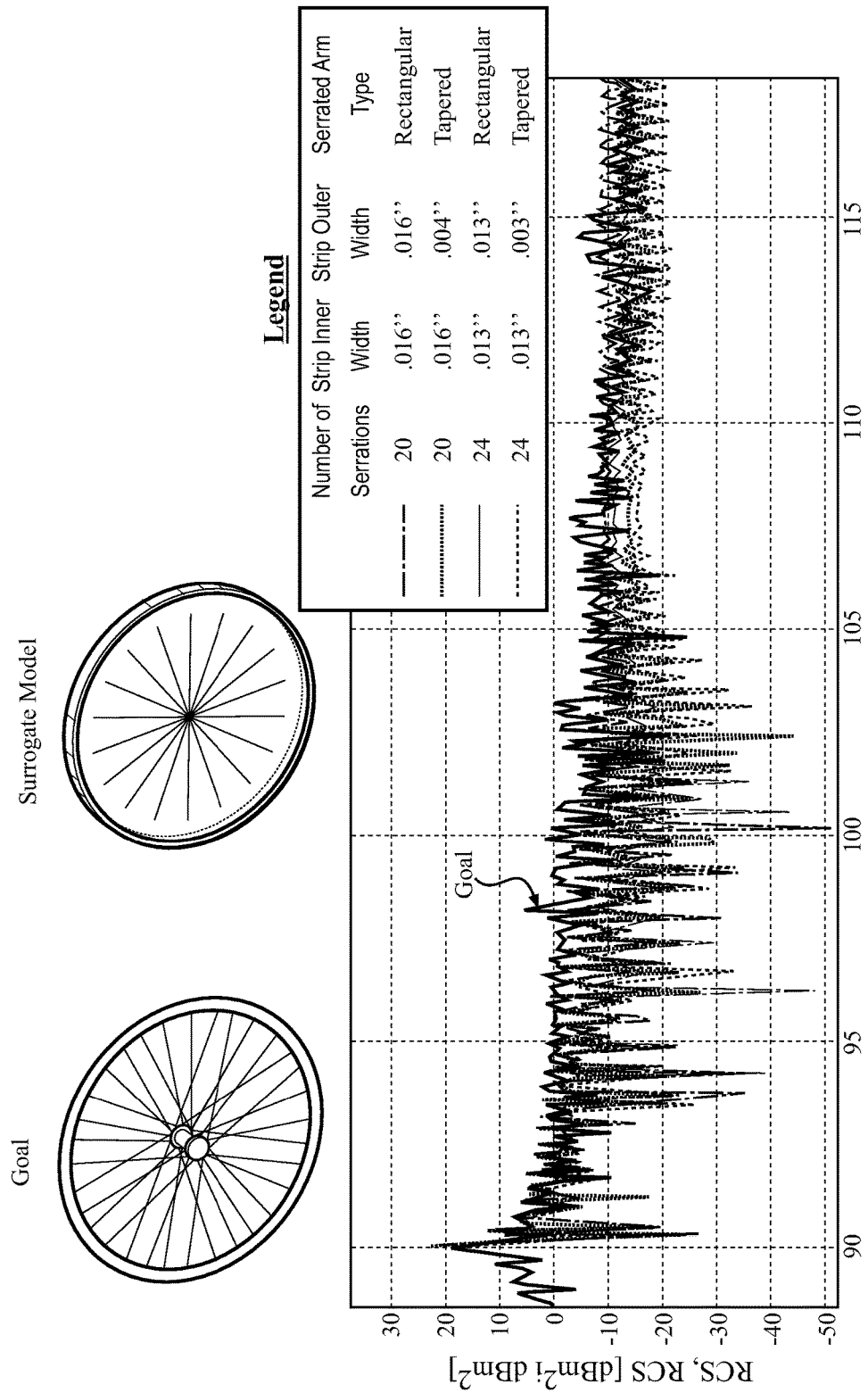
FIG. 11 is a chart showing the performance of the device having a rectangular reflective strip and a trapezoidal reflective strip.

With reference now to FIG. 11, a comparison of the wheel 38 and an actual bicycle wheel is provided. The comparison is made with a wheel 38 having a reflective film 50 with twenty (20) reflective strips 52. The width of the respective strips 52 is also varied and the shape of the respective strips is varied. FIG. 11 shows that the changes in the width of the reflective strips 52 does not affect the radar cross section of the wheel 38 as much as the width of the rim.

Figure 12:
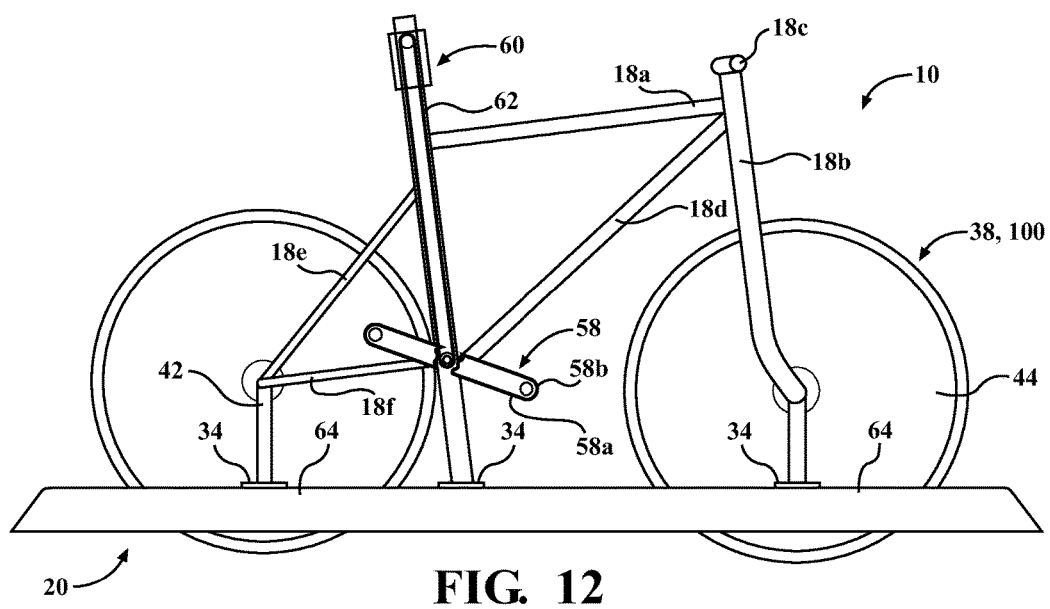
FIG. 12 is an illustrative view of the apparatus with a drive mounted at the top portion of the support beam.

With reference again to FIG. 1 and now also to FIGS. 12 and 13, the apparatus 10 may further include a pair of pedals 58 and a drive 60 configured to rotate the pedals 58. The pedals 58 include a first arm 58a. The first arm 58a is configured to rotate about a common axis and a second arm 58b is fixedly mounted to the distal end of the first arm 58a. As shown in FIG. 1, the feet of the mannequin 14 are fixed to the second arm 58b. The mannequin 14 includes articulated joints at the legs 24a configured to mimic the bending at the knees when pedaling the bike. Thus, it should be appreciated that the movement of the legs 24a is controlled by the rotation of the pedals 58 which is driven by the drive 60.

With reference specifically to FIG. 12, the drive 60 is mounted to a top portion of the first support beam 16. The drive 60 includes a pulley 62 which may be housed within the bore 26a of the first support beam 16. The pulley 62 is mechanically connected to an axis of the pedals 58 so as to rotate the pedals 58 in a continuous movement. With reference now to FIG. 13, another embodiment of the drive 60 is provided. The drive 60 is mounted at the bottom end of the first support beam 16 adjacent the pedals 58.

Figure 14A:
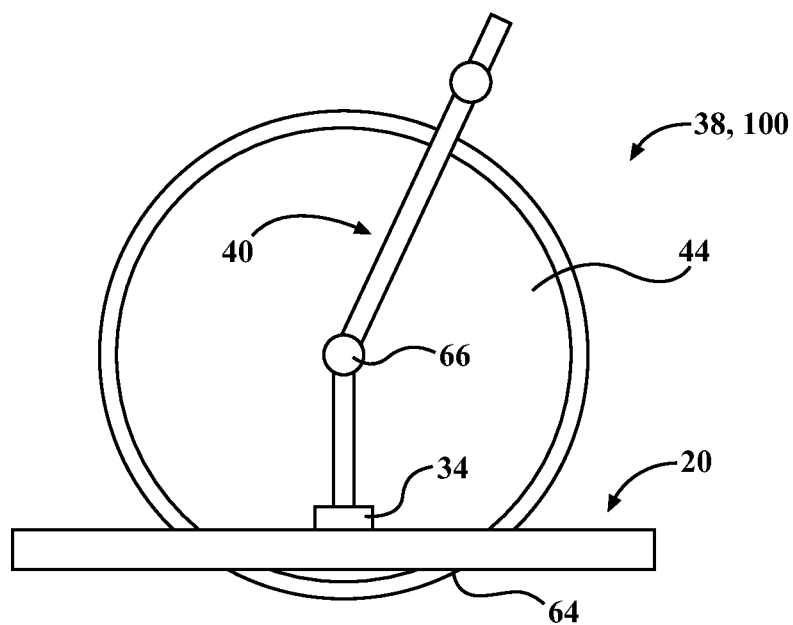
FIG. 14A is an isolated view showing the wheel engaged with the slot of the carriage.
Figure 14B:
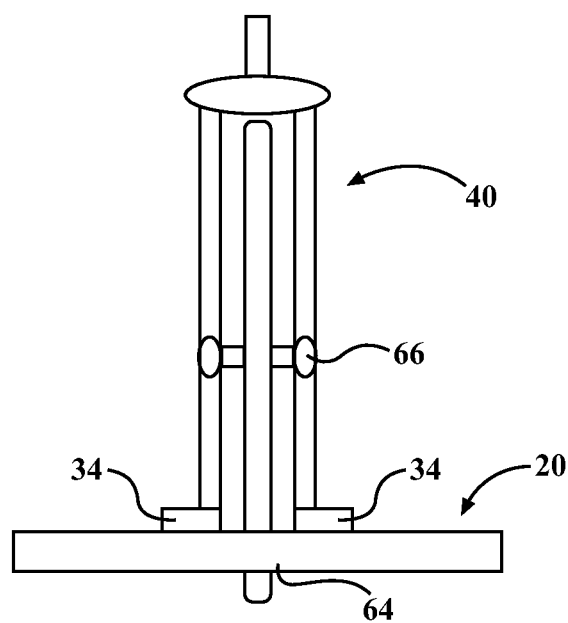
FIG. 14B is a front view of FIG. 14A showing the shaft and the device rotatably mounted to the shaft.

With reference now to FIGS. 14A and 14B, the wheel 38 may be rotatably mounted to the frame 12. In such an embodiment the carriage 20 includes a slot 64. The slot 64 may be configured to receive both the front and back wheels 38 of the apparatus 10. The back and front tire supports 40, 42 are mounted on opposite sides of the front and back wheels 38 of the apparatus and a shaft 66 is mounted between the pair of front and back tire supports 40, 42. The center patch 54 of the wheel 38 is pierced by the shaft so as to allow the wheel 38 to rotate.

As shown, a portion of the wheel 38 extends beneath the bottom surface of the carriage 20 so as to touch the ground wherein when the carriage 20 is moved the wheel 38 is rotated. As discussed above, the front and back tire supports

40, 42 are formed of a radar transparent material such as a polycarbonate so as to not interfere with the reflectivity of the reflective film 50. It should also be noted that rotation of the wheel 38 may be desirable when conducting automotive testing wherein a reflector on the wheel of a bike is to be detected, such as automotive testing simulating night conditions.

With reference again to FIGS. 2, 6, 7A and 7B, a device 100 configured to have a radar cross section pattern similar to that of an actual bicycle wheel when seen by automotive radar is provided. The device 100 has a general shape of a bicycle wheel, and is further configured to resemble the components of a bicycle wheel so as to be recognized as a bicycle wheel by an optical sensor.

With reference now to FIGS. 2, 6 and 7A, the device 100 includes a disk 44 having a first radar transparent layer 46 and a reflective film 50. The first radar transparent layer 46 is mounted on the reflective film 50. The first radar transparent layer 46 is transparent to both radar signals and light. The reflective film 50 has a radar cross section pattern of the actual bicycle wheel as seen by automotive radar. Further, as the first radar transparent layer 46 is transparent to light, the shape of the reflective layer 50 may be recognized as a bicycle wheel by an optical sensor, as discussed below. With reference now to FIG. 7B, the device 100 may further include a second radar transparent layer 48, wherein the reflective film 50 is disposed between the first radar transparent layer 46 and the second radar transparent layer 48.

The reflective film 50 includes a plurality of reflective strips 52 extending radially from a center patch 54 of the reflective film 50 and an outer strip 56 disposed on a circumferential edge of the reflective film 50. The reflective strips 52, outer center patch 54 and outer strip 56 are formed of a material configured to reflect radar. Any such material currently known and used to reflect radar may be adapted for use herein, illustratively including gold. It should also be appreciated that any combination of material configured to reflect radar may be used based upon the radar cross section pattern desired. For instance, the reflective strips 52, outer center patch 54 and outer strip 56 may include three layers wherein an outer layer is formed of gold, an intermediate layer is formed of tin, and a bottom layer is formed of copper. Thus, it should be appreciated that the device 100 may be recognized as a bicycle wheel by an optical sensor as the reflective strips 52 and outer strip 56 visually resemble the spokes and rim of an actual bicycle wheel.

It should also be appreciated that the number of strips and the dimension of the strips may be modified based upon the desired radar cross section pattern. For instance, the reflective strips 52 may have a generally rectangular dimension or the reflective strips 52 may have a generally trapezoidal dimension. The dimension and shape of the reflective strip 52 and outer strip 56 may also be modified based upon the frequency of the automotive radar being evaluated as discussed above. In the instance of a reflective strip 52 having a trapezoidal dimension, the proximal end of the strip is wider than the distal end of the reflective strip 52. The reflective strips are spaced equally apart from each other. The number of reflective strips 52 may also vary based upon the desired radar cross section pattern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

The invention claimed is:

1. A testing apparatus for repetitive use in automotive testing, the apparatus comprising:
   a carriage,
   a frame mounted to the carriage, the carriage configured to move the frame, the frame having a first support beam and a plurality of second support beams coupled together so as to form a bicycle frame; and
   a detachable coupling member coupling each of the plurality of second support beams to the first support beam so as to allow the frame to separate when impacted and be reassembled for further automotive testing.

2. The testing apparatus as set forth in claim 1, wherein the detachable coupling member is an elastic member.

3. The testing apparatus as set forth in claim 1, wherein the first support beam and each of the plurality of second support beams include a tube having a bore, the elastic member is a plurality of elastic members, a respective one of the plurality of elastic members disposed within a respective bore, wherein an end of each one of the respective plurality of elastic members is secured to the first support beam.

4. The testing apparatus as set forth in claim 3, wherein the first support beam and the second support beam have first layer and an intermediate layer disposed over the tube, the intermediate layer formed of a resilient material.

5. The testing apparatus as set forth in claim 4, wherein the tube is formed of a durable and rigid material, wherein the durable and rigid material is one of either a polycarbonate or garolite.

6. The testing apparatus as set forth in claim 4, wherein the resilient material is foam.

7. The testing apparatus as set forth in claim 4, wherein the first layer is made of a reflective material, and wherein the reflective material is one selected from the group consisting of: steel, copper fabric, titanium, or aluminum.

8. The testing apparatus as set forth in claim 1, wherein the frame is removably mounted to the carriage.

9. The testing apparatus as set forth in claim 1, further including a wheel mounted to the frame, the wheel having a first radar transparent layer and a reflective film, the first radar transparent layer is disposed on the reflective film, the reflective film having a radar signature of an actual bicycle wheel.

10. The testing apparatus as set forth in claim 9, wherein the wheel further includes layer a second radar transparent layer opposite the first radar transparent layer, the reflective film disposed between the first radar transparent layer and the second radar transparent layer.

11. The testing apparatus as set forth in claim 9, wherein the reflective film includes a plurality of reflective strips extending radially from a center patch of the reflective film and an outer strip disposed on a circumferential edge of the reflective film.

12. The testing apparatus as set forth in claim 11, wherein the plurality of reflective strips is made of gold.

13. The testing apparatus as set forth in claim 11, wherein the reflective strips include an outer layer formed of gold, an intermediate layer formed of tin, and a bottom layer formed of copper.

14. The testing apparatus as set forth in claim 11, wherein each of the plurality of reflective strips is rectangular.

15. The testing apparatus as set forth in claim 11, wherein each of the plurality of reflective strips are trapezoidal wherein a proximal end of the strip is wider than a distal end of the strip.

16. The testing apparatus as set forth in claim 9, further including a pedal assembly having a pair of pedals.

17. The testing apparatus as set forth in claim 16, further including a drive configured to rotate the pedals.

18. The testing apparatus as set forth in claim 17, wherein the drive is mounted to a top portion of the first support beam.

19. The testing apparatus as set forth in claim 17, wherein the drive is mounted to a bottom portion of the first support beams.

20. The testing apparatus as set forth in claim 1, further including a wheel mounted to the frame, the wheel having a first radar transparent layer and a reflective film, the first radar transparent layer is disposed on the reflective film, the reflective film having a radar cross section of an actual bicycle wheel, wherein the wheel is rotatably mounted to the frame, the carriage including a slot configured to receive the wheel, a portion of the wheel disposed within the slot so as to allow the wheel to rotate as the carriage is being pulled.

21. A device configured to reflect a radar signal of an actual bicycle wheel, the device comprising:
a disk having a first radar transparent layer and a reflective film, the first radar transparent layer mounted on the reflective film, the reflective film includes a plurality of reflective strips extending radially from a center patch of the reflective film and an outer strip disposed on a circumferential edge of the reflective film, the reflective film having a radar signature of the actual bicycle wheel as seen by automotive radar.

22. The device as set forth in claim 21, further including a second radar transparent layer opposite the first radar transparent layer, the reflective film disposed between the first radar transparent layer and the second radar transparent layer.

23. The device as set forth in claim 21, wherein each of the plurality of reflective strips and the outer strip include an outer layer formed of gold, an intermediate layer formed of tin, and a bottom layer formed of copper.

24. The device as set forth in claim 21, wherein each of the plurality of reflective strips is rectangular.

25. The device as set forth in claim 21, wherein each of the plurality of reflective strips is trapezoidal wherein a proximal end of the strip is wider than a distal end of the strip.

26. The device as set forth in claim 21, wherein each of the plurality of reflective strips are equally spaced apart from each other.

27. The device as set forth in claim 21, wherein each of the plurality of reflective strips and the outer strip are made of gold.

* * * * *